(12) United States Patent
Bi et al.

(10) Patent No.: US 8,030,820 B2
(45) Date of Patent: Oct. 4, 2011

(54) ELECTRIC MOTOR

(75) Inventors: Ronghua Bi, Zhongshan (CN); Huaxin Wu, Zhongshan (CN)

(73) Assignee: Zhongshan Broad-Ocean Motor Co., ltd., Zhongshan (CN)

( * ) Notice: Subject to any disclaimer, the term of this patent is extended or adjusted under 35 U.S.C. 154(b) by 0 days.

(21) Appl. No.: 12/876,180

(22) Filed: Sep. 6, 2010

(65) Prior Publication Data

US 2010/0327676 A1    Dec. 30, 2010

Related U.S. Application Data

(62) Division of application No. 11/779,259, filed on Jul. 17, 2007, now Pat. No. 7,812,485.

(30) Foreign Application Priority Data

Dec. 18, 2006  (CN) .................. 2006 2 0155138 U

(51) Int. Cl.
*H02K 1/06* (2006.01)

(52) U.S. Cl. .... 310/216.116; 310/216.121; 310/216.124

(58) Field of Classification Search .............. 310/51, 310/67 R, 216.009, 216.057, 216.058, 216.113–216.116, 310/216.118, 216.121–216.124, 216.137
See application file for complete search history.

(56) References Cited

U.S. PATENT DOCUMENTS

| | | | | | |
|---|---|---|---|---|---|
| 1,611,942 | A | * | 12/1926 | Persons | 310/216.133 |
| 4,626,725 | A | * | 12/1986 | Kawada et al. | 310/89 |
| 5,061,869 | A | * | 10/1991 | Stewart, Sr. | 310/89 |
| 5,806,169 | A | * | 9/1998 | Trago et al. | 29/596 |
| 7,812,485 | B2 | * | 10/2010 | Bi et al. | 310/51 |

* cited by examiner

*Primary Examiner* — Dang D Le
(74) *Attorney, Agent, or Firm* — Matthias Scholl P.C.; Mathias Scholl

(57) ABSTRACT

An electric motor, including stator core, a shaft, and a shock-absorbing connector including multiple brackets, and a rubber pad. The stator core and the shaft are disposed between the brackets, the shaft is nested in the stator core but not directly mechanically-connected thereto, tightly abuts against the bracket, and passes through the stator core. A through hole is disposed in the stator core and parallel to the shaft, and the rubber pad is received in the through hole.

12 Claims, 2 Drawing Sheets

ELECTRIC MOTOR

CROSS-REFERENCE TO RELATED APPLICATIONS

This application is a divisional of U.S. Ser. No. 11/779,259 filed on Jul. 17, 2007, now pending, which is based on Chinese Patent Application No. 200620155138.X filed on Dec. 18, 2006. The contents of all of these specifications are incorporated herein by reference.

BACKGROUND OF THE INVENTION

1. Field of the Invention

The invention relates to an electric motor.

2. Description of the Related Art

External rotor motors, such as ceiling fan motors, are widely used nowadays. A conventional external rotor motor comprises a shaft affixed to a ceiling, and a stator installed on the shaft. A problem with the external rotor motor is, as the rotor rotates, force produced between the rotor and the stator is transferred to the shaft, and thus causing the shaft to vibrate and to produce unwanted noise.

SUMMARY OF THE INVENTION

In view of the above-described problems, it is one objective of the invention to provide an electric motor having a shock-absorbing connector capable of absorbing and buffering imbalanced force applied on a stator, and reducing shock of the shaft and noise of the motor.

To achieve the above objectives, in accordance with one embodiment of the invention, provided is an electric motor, comprising stator core, a shaft, and a shock-absorbing connector comprising multiple brackets, and a rubber pad. The stator core and the shaft are disposed between the brackets, the shaft is nested in the stator core but not directly mechanically-connected thereto, tightly abuts against the bracket, and passes through the stator core, a through hole is disposed in the stator core and parallel to the shaft, and the rubber pad is received in the through hole.

In a class of this embodiment, the shock-absorbing connector further comprises a rivet.

In a class of this embodiment, the rivet passes through the rubber pad.

In a class of this embodiment, both ends of the rivet are rivet-connected to the brackets.

Advantages of the invention comprises: (1) by way of disposing the shock-absorbing connector between the stator core and the shaft, imbalanced force applied on the stator core is absorbed and buffered., which reduces vibrations of the shaft and noise of the motor, and allows the motor to operate stably. (2) the shock-absorbing connector comprises multiple brackets, a rubber pad and a rivet, the shaft tightly is nested in the stator core and abuts against the bracket, the stator core is disposed between the brackets, a through hole operating to receive the rubber pads is disposed in the stator core, and the rivet is received in the rubber pad, and rivet-connected to the brackets, which make the shock-absorbing connector simple in structure and convenient for mass assembly; in addition, the stator core is fixed in the axial and the radial directions, which reduces vibrations and noise.

DETAILED DESCRIPTION OF THE EMBODIMENTS

Detailed description will be given below in conjunction with specific embodiments and accompanying drawings.

Figure 1:
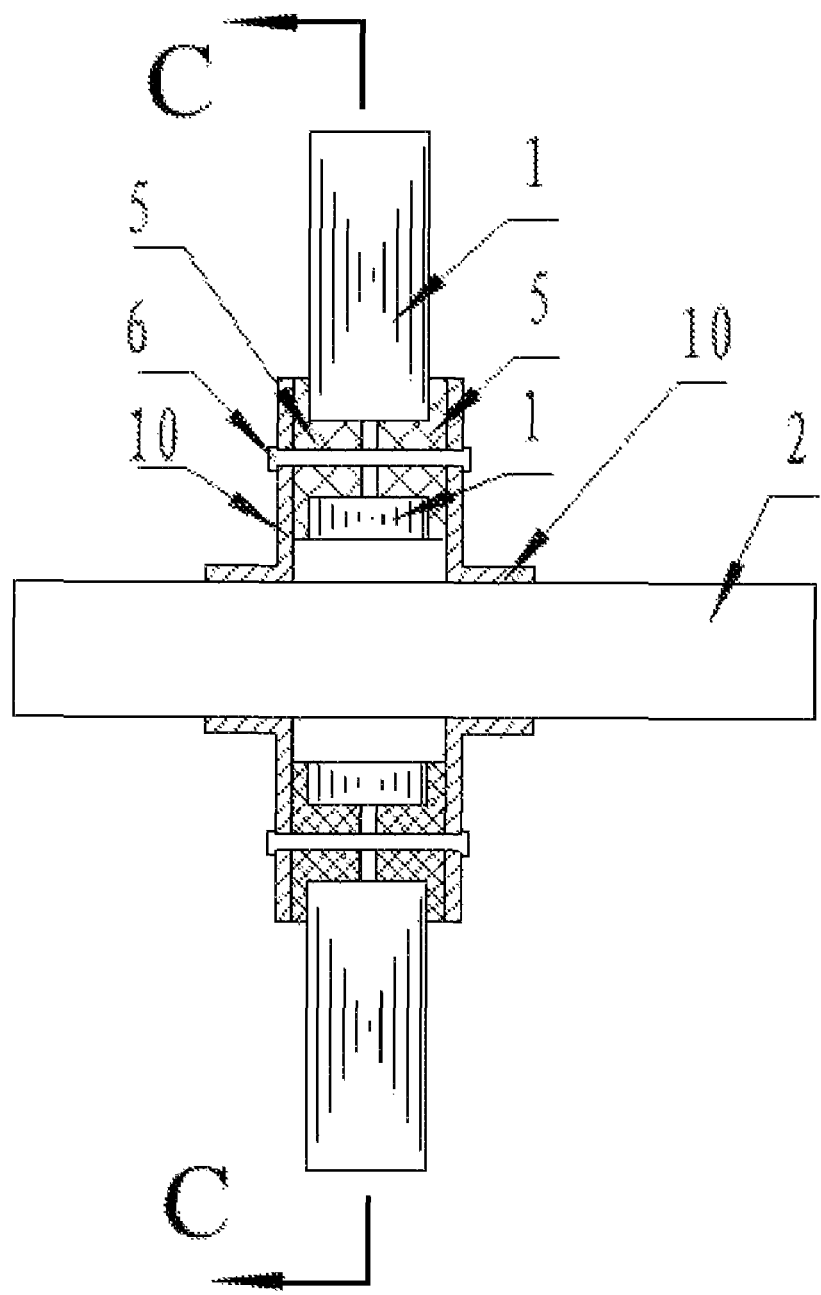
FIG. 1 is a cross-sectional view of a shock-absorbing connector of an exemplary embodiment of the invention.
Figure 2:
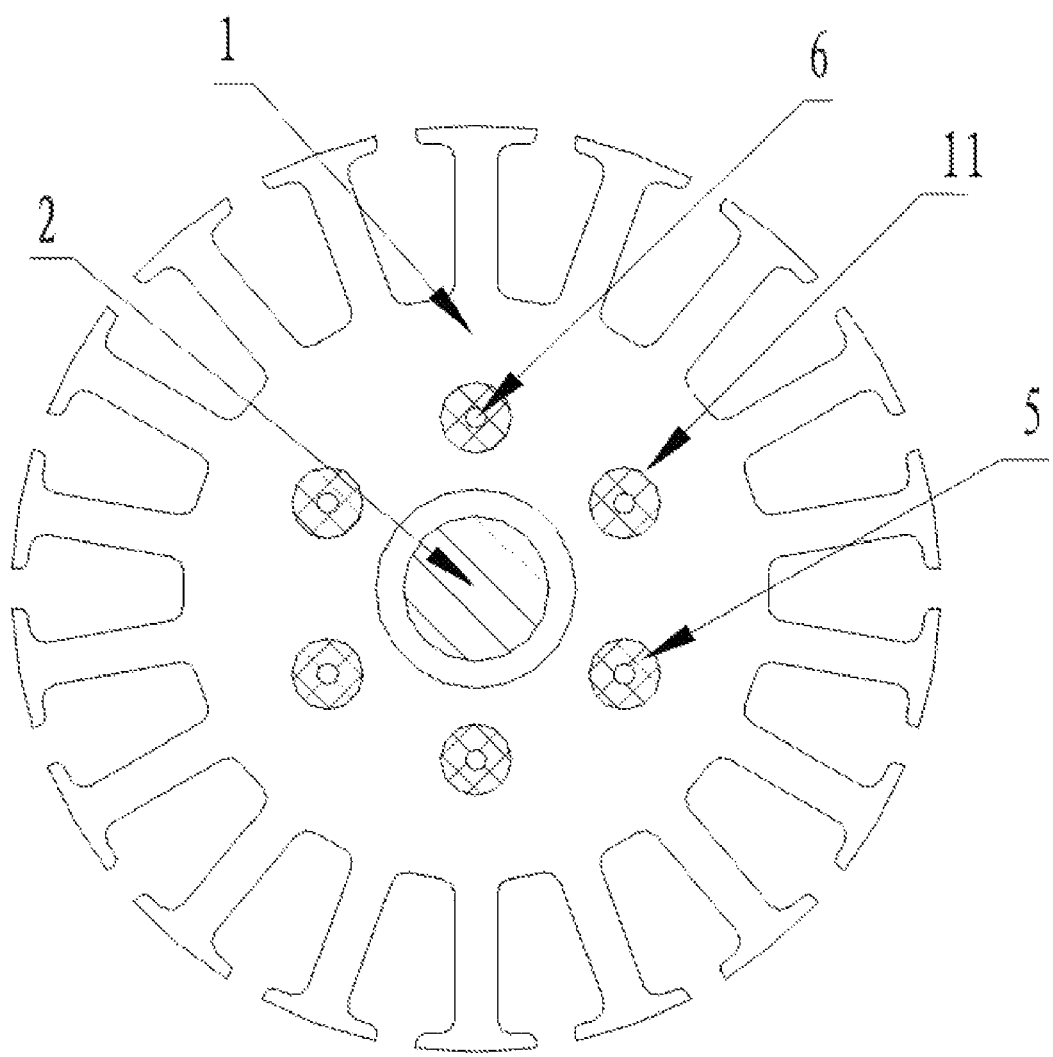
FIG. 2 is a cross-sectional view taken along a line C-C of FIG. 1.

As shown in FIGS. 1 and 2, an electric motor of the invention comprises a stator core 1, a shaft 2, and a shock-absorbing connector comprising multiple brackets 10, a rivet 6, and a rubber pad 5.

The stator core 1 and the shaft 2 are disposed between the brackets 10.

The shaft 2 is nested in the stator core 1, but not directly mechanically-connected thereto, tightly abuts against the bracket 10, and passes through the stator core 1.

A through hole 11 is disposed in the stator core 1 and parallel to the shaft 2, and the rubber pad 5 is received in the through hole 11.

The rivet 6 passes through the rubber pad 5, and is rivet-connected to the brackets 10. In this way, the brackets 10 are indirectly connected to the stator core 1 via the rubber pad 5.

As unbalanced counterforce is applied on the stator core 1, the counterforce is transferred to the rivet 6 via the rubber pad 5, and then to the brackets 10 and the shaft 2. During this process, the rubber pad 5 absorbs most unbalanced force, and thus reducing vibration of the stator core 1 and the shaft 2.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An electric motor comprising
a stator core (1);
a shaft (2); and
a shock-absorbing connector comprising multiple brackets (10), and a rubber pad (5);
wherein
said shaft (2) is nested in said stator core (1) but is not directly mechanically-connected thereto, said shaft (2) tightly abuts against said bracket (10), and said shaft (2) passes through said stator core (1);
a through hole (11) is disposed in said stator core (1) and is parallel to said shaft (2); and
said rubber pad (5) is received in said through hole (11).

2. The electric motor of claim 1, wherein said shock-absorbing connector further comprises a rivet (6).

3. The electric motor of claim 2, wherein said rivet (6) passes through said rubber pad (5).

4. The electric motor of claim 3, wherein both ends of said rivet (6) are rivet-connected to said brackets (10).

5. An electric motor comprising
a stator core (1);
a shaft (2); and
a shock-absorbing connector comprising multiple brackets (10), and a rubber pad (5);
wherein
said stator core (1) is disposed between said brackets (10);
said shaft (2) is nested in said stator core (1) but is not directly mechanically-connected thereto, said shaft (2) tightly abuts against said bracket (10), and said shaft (2) passes through said stator core (1);

a through hole (11) is disposed in said stator core (1) and is parallel to said shaft (2); and said rubber pad (5) is received in said through hole (11).

6. The electric motor of claim 5, wherein said shock-absorbing connector further comprises a rivet (6).

7. The electric motor of claim 6, wherein said rivet (6) passes through said rubber pad (5).

8. The electric motor of claim 7, wherein both ends of said rivet (6) are rivet-connected to said brackets (10).

9. An electric motor comprising a stator core (1);

a shaft (2); and a shock-absorbing connector comprising multiple brackets (10), and a rubber pad (5);

wherein said stator core (1) is disposed between said brackets (10);

said brackets (10) are disposed between said shaft (2) and said stator core (1);

said shaft (2) is nested in said stator core (1) but is not directly mechanically-connected thereto, said shaft (2) tightly abuts against said bracket (10), and said shaft (2) passes through said stator core (1);

a through hole (11) is disposed in said stator core (1) and is parallel to said shaft (2); and said rubber pad (5) is received in said through hole (11).

10. The electric motor of claim 9, wherein said shock-absorbing connector further comprises a rivet (6).

11. The electric motor of claim 10, wherein said rivet (6) passes through said rubber pad (5).

12. The electric motor of claim 11, wherein both ends of said rivet (6) are rivet-connected to said brackets (10).

* * * * *